United States Patent Office 3,352,685
Patented Nov. 14, 1967

3,352,685
PROCESSES FOR PREPARING BLOOD MEAL
Earl H. Hess, Lancaster, Pa., assignor to Victor F. Weaver, Inc., Lancaster, Pa., a corporation of Pennsylvania
No Drawing. Filed Dec. 19, 1963, Ser. No. 331,962
13 Claims. (Cl. 99—7)

ABSTRACT OF THE DISCLOSURE

Animal blood is coagulated by the application of moist heat in the presence of sufficient acid to maintain the pH of the mixture more acidic than a pH of 6.7. The product obtained is a granular solid which is then separated from the supernatant liquid and dried at ambient temperature. A sequestering agent may be used to coordinate with the hemoglobin iron.

---

Although animal blood is available in large economical quantities containing solid matter consisting almost entirely of protein having a well balanced amino acid composition, relatively little blood meal has been used in animal feeds due in large part to the unpalatability, poor digestibility and low biological value attributed to commercially available bood meal. Because of the "liver-like" consistency of coagulated blood and concomitant difficulty in handling, blood meals heretofore commercially available have in general been prepared by processes in which the dry meal is recovered by evaporating nearly all the water at elevated temperatures. Although such processes destroy the pathogenic microorganisms present in the whole blood and afford some degree of storage life to the product, the use of the elevated temperatures required to evaporate the water present, particularly during the later stages of drying, destroys heat sensitive essential amino acids, diminishes the reactivity toward proteolytic enzymes, and otherwise severely reduces the nutritive value of the blood protein.

The following features and advantages which flow from the present invention are realized from the use of chemical additives, more particularly acids, either alone or in combination with sequestering agents, during the coagulation of the whole blood to influence the formation of a granular solid which is readily separable from the supernatant liquid in almost quantitative yields by such economical means as filter pressing, centrifugation and the like thus making it practical to avoid the detrimental high temperatures normally associated with blood meal preparation and to inhibit oxidative degradation during the coagulation process thus preserving a higher percentage of the original nutritive value. Such coagulum has less affinity for water and can be air dried to a stable form under mild conditions thereby avoiding the use of elevated temperatures of the prior art detrimental during the later drying stages and permitting the formulation of a meal having augmented nutritive value and feed efficiencies.

In preparing the improved blood meal according to the present invention the whole blod can be used directly as drawn from th animal or after having clotted. In common practice the blood usually clots immediately following collection and before it can conveniently be processed, in which case a brief homogenization preceeds the chemical treatment.

An amount of acid sufficient to maintain the pH of the solution more acidic than a pH of at least, 6.7 and preferably at a pH from about 5.7 to 6.3 is added to the homogenized mass.

The heating of the whole blood is advantageously effectuated under the relatively air-free conditions of an autoclave at pressures ranging from about 5 to 50 p.s.i.g. for 10–30 minutes when thus heated (0.20 to 3.0 parts by weight of a sequestering agent per 100 parts blood solids, and preferably 0.5 to 1.0 parts may also be added). Alternately, the heat coagulation can be made to occur in an open kettle at or about the boiling point of water at atmospheric pressure, in which case amounts of the sequestering agent in the range of 1.0 part to 3.0 parts are preferred.

Insofar as the nature of the acid used in the above process is concerned ortho-phosphoric acid is particularly preferred. However, a wide variety of acids, both inorganic and organic can be used as well. Exemplary, but without intent to be thereby limited, these are hydrochloric, sulfuric, lactic, citric acids, etc. Seemingly, the only limitation is that the acid not be a strong oxidizing agent and also that trace amounts remaining in the final product should not constitute a health hazard to the animals consuming it.

Likewise a variety of sequestering agents function well in this process, exemplary of which are the ethylenediamine derivatives of the formula wherein each R,

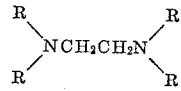

taken separately, represents hydroxyalkyl or carboxymethyl. Preferred hydroxyalkyl moieties have 2 to 5 carbons. Particularly preferred are those derivatives wherein at least 3 of the substituent R's are —$CH_2CO_2H$ groups and the fourth R substitutent is the 2-hydroxyalkyl or —$CH_2CO_2H$. Exemplary sequestering agents include among others ethylenediamine tetraacetic acid, N-(hydroxyethyl)-ethylene diamine triacetic acid, N-2-hydroxypropyl)-ethylene diamine triacetic acid, etc. It will be obvious that other well known sequestering agents are equally effective.

The whole blood meal treated as above may be then admixed as protein supplement with a basal ration containing carbohydrates, fats, complimentary proteins, vitamins, minerals and like growth ingredients. Because of the improved palatability and digestability of the blood meals prepared by the process of the present invention, a greater proportion of the protein content of such complete ration can be made up of blood meal and improved growth responses can be realized from the animals fed this ration.

The following examples are illustrative but not limitative of the various embodiments of the present invention:

Effect of Chemical Treatment on Filtering and Drying Characteristics of Coagulum and on its invitro Digestability.

Example 1.—Chicken blood

Four samples of whole chicken blood taken from the same previously homogenized batch and of equal weight were provided. No acid was added to samples 1 and 2. The pH of samples 3 and 4 was adjusted to 6.1 by the addition of 2.5 parts of orthophosphoric acid per 1000 parts liquid blood. To samples 2 and 4 were added 1.0 part of N-(hydroxyethyl) ethylene diamine triacetic acid. All samples were autoclaved at 15 p.s.i.g. for 15 minutes. Thereafter the coagulum in each of the autoclaved samples was subjected to a filter press treatment of 150 p.s.i.g. and the amount of supernatant released from each was measured. Moisture determinations were made on a part of the press cake from each treatment and "rate of drying" studies were made on another portion by allowing them to air dry for 24 hours at room temperature. These later portions when dry were in turn used to measure the comparative in vitro protein digestabilities using the enzyme pepsin in dilute acid medium. The essential detail of this procedure is offered in Methods of Analysis, Association of Official Agricultural Chemists, Ninth ed., p. 286. In the table below are listed the results of this experiment.

|  | Sample 1 No chemical additive | Sample 2 Sequestering agent only | Sample 3 Acid only | Sample 4 Acid plus sequestering agent |
| --- | --- | --- | --- | --- |
| Percent total H²O removed by filterpress | 70 | 68 | 78 | 78 |
| Moisture content after 24 hr. air-drying | 22.4 | 18.0 | 9.8 | 10.4 |
| Percent total protein recovery | 99 | 99 | 100 | 98 |
| Percent pepsin digestibility [1] | 98 | 91 | 92 | 94 |

[1] Commercial meal—50% digestible under conditions of test.

Example 2.—Beef blood

An experiment similar in all respects to Examples 1 was conducted except that beef blood was used and Sample 2 (sequestering agent only) was omitted from the series. The results are tabulated below.

|  | Sample 1 No chemical additive | Sample 3 Acid only | Sample 4 Acid plus sequestering agent |
| --- | --- | --- | --- |
| Percent total water removed by filterpress | 61 | 68 | 71 |
| Moisture content after 24 hr. air-drying | 21 | 15 | 3.2 |
| Percent total protein recovered | 100 | 98 | 100 |
| Percent pepsin digestibility [1] | 100 | 100 | 100 |

[1] Commercial meal—40% digestible under conditions of test.

Example 3.—Pork blood

Experiment 2 was repeated using pork blood with the following results:

|  | Sample 1 No chemical additive | Sample 3 Acid only | Sample 4 Acid plus sequestering agent |
| --- | --- | --- | --- |
| Percent total water removed by filterpress | 62 | 69 | 68 |
| Moisture content after 24 hr. air-drying | 17.4 | 14.0 | 11.9 |
| Percent total protein recovered | 98 | 99 | 100 |
| Percent pepsin digestibility [1] | 96 | 99 | 97 |

[1] Commercial meal—60% digestible under conditions of test.

Sample 4.—Improved digestibility as determined by chick feeding experiment

Quantities of chicken blood meal were prepared according to the techniques described in Example 1 (Sample 1—no chemical additive, Sample 3—acid only, and Sample 4—acid plus sequestering agent). These samples along with a quantity of commercially dried chicken blood meal were assayed for total crude protein and incorporated as the sole sources of protein into a series of test diets as set forth of Scott.[1] All test diets were identical in composition (dextrose, corn oil, vitamins, minerals, etc.) except for the type of blood meal used. Each was added so as to provide 13% crude protein in the total chick diet.

From a group of 100 one week old cockerels were selected 64 of most uniform weight and these in turn were divided into 8 groups of 8 chicks each, each group being placed in its separate compartment in a standard chick battery. Duplicate lots were fed their respective diets for a period of three weeks during which time feed consumption was measured and individual chick weight gains were periodically determined. At the end of the test period all data were calculated, and subjected to rigid statistical analyses.

In the table below are listed summary data:

| Diet | Commercial meal | Sample 1 No Chem. Additive | Sample 3 Acid Only | Sample 4 Acid-sequestering agent |
| --- | --- | --- | --- | --- |
| Average wt. gain (in grams) per chick during 3 wk. period | 77 | 128 | 123 | 128 |
| Feed consumed/weight gained | 4.50 | 3.35 | 3.30 | 3.15 |

These data clearly demonstrate the outstanding superiority in nutritive value of the three experimental meals as compared to the present commercial product. They further demonstrate that the use of acid to produce a more easily filterable coagulum has no adverse effect on nutritive value and that even in the relatively air free autoclave a small amount of sequestrant is of value in preventing metal catalyzed oxidation, thus preserving nutritive value.

Example 4

Example 1 is repeated with like results but with hydrochloric acid used in place of ortho-phosphoric acid in sufficient quantity to give comparable pH values.

Example 5

Example 1 is repeated with like results but with sulfuric acid used in place of ortho-phosphoric acid in sufficient quantity to give comparable pH values.

Example 6

Example 1 is repeated with like results but with lactic acid used in place of ortho-phosphoric acid in sufficient quantity to give comparable pH values.

Example 7

Example 1 is repeated with like results but with citric acid used in place of ortho-phosphoric acid in sufficient quantity to give comparable pH values.

Having now described the invention in considerable detail and by way of multiple examples, it will be appreciated that the objects and advantages as set forth at the outset of the present specification have been successfully achieved.

What is claimed is:

1. A process for preparing blood meal by heating at least at boiling temperatures a material consisting essentially of whole blood for a period of time sufficient to coagulate the solids therein, said whole blood being in admixture with an effective amount of acid sufficient to maintain the pH of the mixture more acidic than a pH of 6.7 thereby forming a granular solid, separating the granular solid from the supernatant liquid, and drying the separated granular solid to form a dry stable product.

2. The process according to claim 1 wherein the pH is from about 5.7 to 6.3.

3. The process according to claim 2 wherein the whole blood is autoclaved at from about 5 to 50 p.s.i.g. for about 10 to 30 minutes.

4. The process according to claim 2 wherein the whole blood is subjected to atmospheric boil in additional admixture with an effective amount of sequestering agent to coordinate with the hemaglobin iron sufficient to prevent degradative oxidation reactions catalyzed thereby.

5. The process according to claim 4 wherein the sequestering agent is present in from 0.20 to 3.0 parts per 100 parts of blood solids.

[1] Hinners, S. W.; Scott, H. M.: A Bioassay for Determining the Nutritional Adequacy of Protein Supplements for Chick Growth, Poultry Science 39: 176, 1960.

6. The process according to claim 5 wherein the sequestering agent is selected from the group of the formula

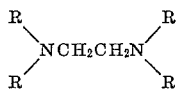

wherein each R, taken individually, is selected from the group consisting of hydroxyalkyl having 2 to 5 carbons and

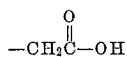

7. The process according to claim 6 wherein the sequestering agent is ethylenediaminotetraacetic acid.

8. The process according to claim 6 wherein the sequestering agent is N(2-hydroxyethyl) ethylenediaminotriacetic acid.

9. The process defined in claim 5 wherein said acid is selected from the group consisting of phosphoric, hydrochloric, sulfuric, lactic, citric and mixtures thereof.

10. A process for treating a material consisting essentially of whole blood comprising autoclaving whole blood in a moist atmosphere in admixture with an effective amount of phosphoric acid sufficient to maintainin a pH of from about 5.7 to 6.3 at a pressure of from about 5 to 50 p.s.i.g. for about 10 to 30 minutes to form a granular solid separating the granular solid from the supernatant liquid at ambient temperatures and air drying the separated solid to a stable meal having augmented nutritive value as a protein supplement in animal feedstuffs.

11. The process according to claim 10 wherein the granular solid is separated from the supernatant liquid by filter pressing.

12. A process for treating a material consisting essentially of whole blood comprising heating the whole blood at atmospheric boil for about 10 to 30 minutes in admixture with an effective amount of phosphoric acid sufficient to main a pH of about 5.7 to 6.3 together with about 1.0 to 3.0 parts by weight per 100 parts of blood solids of a sequestering agent of the formula

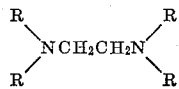

wherein three of said R groups are

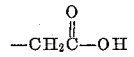

and the fourth R group is selected from the group consisting of hydroxyalkyl of 2 to 5 carbons and

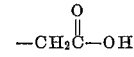

to form a granular solid separating the granular solid from the supernatant liquid at ambient temperature and air drying the separated solid to a stable meal having augmented nutritive value as a protein supplement in animal feedstuffs.

13. The process according to claim 12 wherein the granular solid is separated from the supernatant liquid by filter pressing.

References Cited

UNITED STATES PATENTS

| | | | |
|---|---|---|---|
| 2,165,721 | 7/1939 | Norman | 99—21 |
| 2,251,334 | 8/1941 | Hall | 99—21 |
| 2,277,718 | 3/1942 | Sanders | 99—7 X |
| 2,996,383 | 8/1961 | Gershon | 99—21 X |
| 3,095,306 | 6/1963 | Peat. | |
| 3,123,593 | 3/1964 | Allan et al. | 99—21 X |
| 3,243,302 | 3/1966 | Melnick | 99—163 |

A. LOUIS MONACELL, *Primary Examiner.*

D. DONOVAN, J. M. HUNTER, *Assistant Examiners.*